United States Patent
Kuehn et al.

(10) Patent No.: US 7,631,179 B2
(45) Date of Patent: Dec. 8, 2009

(54) SYSTEM, METHOD AND APPARATUS FOR SECURING NETWORK DATA

(75) Inventors: Dennis Lee Kuehn, Redondo Beach, CA (US); Michael Robert Mott, Midway City, CA (US)

(73) Assignee: The Boeing Company, Seattle, WA (US)

( * ) Notice: Subject to any disclaimer, the term of this patent is extended or adjusted under 35 U.S.C. 154(b) by 362 days.

(21) Appl. No.: 10/211,086

(22) Filed: Aug. 2, 2002

(65) Prior Publication Data

US 2004/0025008 A1    Feb. 5, 2004

(51) Int. Cl.
H04L 29/00 (2006.01)
H04L 29/06 (2006.01)

(52) U.S. Cl. .......................................... 713/151; 707/8

(58) Field of Classification Search ........................ None
See application file for complete search history.

(56) References Cited

U.S. PATENT DOCUMENTS

| | | | |
|---|---|---|---|
| 5,799,206 A * | 8/1998 | Kitagawa et al. | 710/36 |
| 5,893,166 A * | 4/1999 | Frank et al. | 711/163 |
| 6,088,796 A | 7/2000 | Cianfrocca et al. | |
| 6,687,702 B2 * | 2/2004 | Vaitheeswaran et al. | 707/10 |

(Continued)

OTHER PUBLICATIONS

Ramkumar V. Chary, Robert C. Gammill, "An interprocess communication facility for the model a multi-microcomputer system", Dec. 1983, Proceedings of the 1983 ACM SIGSMALL symposium on Personal and small computers.*

(Continued)

*Primary Examiner*—Nasser G Moazzami
*Assistant Examiner*—Jeffery Williams
(74) *Attorney, Agent, or Firm*—Alston & Bird LLP (57) ABSTRACT

The system, method and apparatus for securing network data of the present invention provide security for internal networks by utilizing a common storage element for the exchange of data between the external and internal components, without creating a concurrent session between the external and internal components. In addition, when the protocol of the external network is Internet Protocol (IP), the protocol used for the internal network may be a non-IP messaging protocol that is a more secure protocol than IP, and insulates the internal network from the type of attacks that are common in IP networks. These security measures may be implemented without a significant change to the hardware or software elements of the internal or external networks, and, therefore, without adding significant cost to the network administration and without the network performance degradation that is characteristic of conventional security measures.

28 Claims, 4 Drawing Sheets

U.S. PATENT DOCUMENTS

| | | | | |
|---|---|---|---|---|
| 6,728,963 | B1* | 4/2004 | Forin et al. | 719/310 |
| 7,206,805 | B1* | 4/2007 | McLaughlin, Jr. | 709/203 |
| 7,296,291 | B2* | 11/2007 | Tahan | 726/11 |
| 2003/0033441 | A1* | 2/2003 | Forin et al. | 709/315 |
| 2003/0056063 | A1* | 3/2003 | Hochmuth et al. | 711/152 |
| 2003/0088544 | A1* | 5/2003 | Kan et al. | 707/3 |
| 2004/0117438 | A1* | 6/2004 | Considine et al. | 709/203 |
| 2004/0162930 | A1* | 8/2004 | Forin et al. | 711/1 |
| 2005/0223018 | A1* | 10/2005 | Forin et al. | 707/100 |
| 2005/0226406 | A1* | 10/2005 | Forin et al. | 380/1 |
| 2005/0246511 | A1* | 11/2005 | Willman et al. | 711/163 |

OTHER PUBLICATIONS

David C. Walden, "A system for interprocess communication in a resource sharing computer network", Apr. 1972, Communications of the ACM, vol. 15 Issue 4.*

"Scheme for Integrating Transmission Control Protocol/Internet Protocol Socket Support in a Database Manager", Apr. 1, 1993, IBM Technical Disclosure Bulletin.*

Definition for "Network", The Authoritative Dictionary of IEEE Standards Terms, 2000, IEEE Press.*

Druschel et al., "IO-Lite: A Unified I/O Buffering and Caching System", 2000, ACM, p. 37-66.*

Kath, "Managing Memory-Mapped Files in Win32", 1993, Microsoft, p. 1-13.*

* cited by examiner

SYSTEM, METHOD AND APPARATUS FOR SECURING NETWORK DATA

BACKGROUND OF THE INVENTION

This invention relates to the security of data stored in internal network elements that provide the data to outside network users and, in particular, to the utilization of a common storage element where certain data is written and read by the internal and external elements in order to prevent unauthorized external users from accessing the internal network.

With the increase in network-based services and transactions, such as purchases, bank account transfers, and various other transactions that require transmission of sensitive personal data, there has been a corresponding increase in the amount of sensitive information that is stored by internal network databases or other storage elements that are accessible via a network, such as the Internet and any other type of external network. Many of the internal network storage elements are connected to an internal network via the same protocol used throughout various external networks and by users of the networks, namely Internet Protocol (IP), which is a protocol that requires each physical network interface to have one or more addresses, called IP addresses. As such, communication between two IP network elements involves specification of a source and a destination address. The addresses are carried in the data packets that are transmitted between the network elements, and a login session is initiated between the addressees to transmit the data.

Because many internal and external network elements are in communication with internal and external networks via IP protocol, there is an increasing concern that the sensitive personal information stored by internal network storage elements that is accessible via IP networks is not completely secure. For example, unauthorized users have been able to access internal network-based merchant databases and steal the customer credit card numbers stored therein. Unauthorized users are able to steal the sensitive information due, in part, to the fact that IP is designed to be open and accessible to all Internet users, which facilitates utilization of the Internet and the systems connected to the Internet, but results in a lack of security mechanisms. Thus, it is very difficult to secure internal databases or other storage elements when they have an IP connection to internal networks.

The conventional manner in which network designers add security for the internal network elements, such as servers, databases, and other systems containing sensitive information, is to add layers of security on top of IP. The typical approach is to place firewalls between an internal network and the external network to protect the internal network elements from being freely accessible from the external network. A firewall is a computer system or a group of computer systems that implements filtering, monitoring and logging of sessions between the networks because all information passing between the networks must pass through the firewall. Firewalls may be implemented in applications or in hardware units, such as routers or servers. One type of firewall is a screening router that examines and discriminates network traffic based upon the IP packet addresses and/or other criteria, such as type of protocol and authentication, which allows communication managers to build "profiles" of users who are allowed access to different applications. Another type of firewall is a proxy server, which is implemented as a workstation on a server and looks at all of the data in each packet and, in most cases, replaces the address with proxy destinations that are known to be secure. While proxy servers provide security by hiding the internal network from the outside world, they can significantly degrade the performance of the network, especially in high traffic areas, because of the overhead involved in inspecting all of the data in each packet. In addition, firewalls cannot prevent all attacks to an internal network from an external network because an unauthorized user who knows or guesses how the internal network is configured can trick the firewall and/or the internal network elements into believing the unauthorized user is an authorized user of the internal network.

Unauthorized users take advantage of the inherently non-secure nature of IP and the options included in IP to facilitate network operations in order to gain access to the internal network and/or the data transmitted through the internal network. IP provides, for example, source routing that helps with network debugging and allows a user to coerce data packets along a given route, and Internet Control Management Protocol (ICMP) redirect that helps data packets find their destination in the event of an incorrect network configuration. Each of these techniques allow modification of a computer system's routing table, which enable unauthorized users to add their computers in the computer system's route for data packets. In addition, unauthorized users are able to pretend to be another computer by "borrowing" the other computer's IP address, which is commonly called address spoofing. If the borrowed IP address is the address of an internal network element, the unauthorized user can send data packets to the internal network from the Internet because the firewall and other internal network elements believe the data is coming from an authorized user. Once unauthorized users are inside the internal network, they may use various techniques to establish connections with internal storage elements or main/root elements, from which they can obtain information or assume control of the internal computer system.

Placing another firewall or filtering system behind the firewall at the perimeter of the internal network may enable detection of unauthorized users of the internal network, but this configuration still does not prevent the unauthorized user from accessing the internal network elements. One manner in which network administrators attempt to identify unauthorized users of internal networks is to set up a false internal network with access to the outside network(s) that attracts unauthorized users and tracks them. These configurations, however, also do not provide complete security for an internal network because they do not prevent unauthorized users from accessing the real internal network.

Thus, there is a need in the industry to secure internal networks from attacks by unauthorized users. In particular, there is a need to not only detect unauthorized users of an internal network, but also prevent unauthorized users from accessing the internal network storage elements, without creating network performance degradation and without adding significant cost.

BRIEF SUMMARY OF THE INVENTION

The system, method and apparatus for securing network data of the present invention provide security for internal networks without creating network performance degradation and without adding significant cost. By utilizing a common storage element for the exchange of data between the external and internal components without creating a concurrent session between the external and internal components, the present invention prevents unauthorized users from accessing the internal network because there is never an open path between the external and internal components. In addition, when the protocol of the external network is Internet Protocol (IP), the protocol used for the internal network may be a non-IP messaging protocol that is more secure than IP. Thus, there may be a protocol break between the IP protocol of the external network and the non-IP messaging protocol of the internal network that provides further security for the internal network by insulating the internal network from IP. Because the common storage element and protocol break security measures may be implemented without a significant change to the hardware or software elements of the internal or external networks, the system, method, and apparatus of the present invention provide the necessary security for the internal network without adding significant cost to the network administration. Furthermore, the system, method, and apparatus for securing network data of the present invention eliminate the need for multiple high-overhead security elements, such as firewalls, in the internal network, which, in turn, creates an efficient and secure network without the network performance degradation that is characteristic of conventional security measures.

The system, method and apparatus for securing network data of the present invention include a network, first and second storage elements, a network server, and a database server. The network server is in communication with the network, such as an external network, and the first storage element. The database server is also in communication with the first storage element and the second storage element. The database server may be any type of data source, such as a file system, a common executive, a custom application and/or memory that runs on any type of device or processing element capable of running such applications.

The first storage element represents a storage element that is common to both the internal and external network components, while the second storage element represents the internal network storage devices that may store sensitive data. The first storage element may receive and store data from the network server in a first predetermined location, and the database server is capable of accessing the data stored in the first predetermined location. The first storage element also may receive and store data from the database server in a second predetermined location, and the network server is capable of accessing the data stored in the second predetermined location. Thus, the network server and the database server are capable of exchanging data via the first storage element without creating a concurrent operating session between the network server and the database server. This prevents unauthorized users from being able to access the internal network, which includes the database server and the second storage element. Any type of signaling known to those skilled in the art, such as discrete signaling, may be utilized for communication between and among the various components of the system via the internal and external networks. In addition, the components may not necessarily be hard-wired, but instead may communicate via wireless transmissions utilizing blue tooth or other protocols.

The network server and the database server may be capable of transmitting and receiving metadata that at least partially defines associated data. In this embodiment, the first storage element stores the metadata received from the network server in a third predetermined location, and the metadata, in turn, defines the first predetermined location at which data that is also received from the network server is stored. The database server may then access the metadata from the third predetermined location to obtain the first predetermined location of the network server data at which the actual data is stored. The first storage element also stores the metadata received from the database server in a fourth predetermined location, and the metadata, in turn, defines the second predetermined location at which data that is also received from the database server is stored. The network server may then access the metadata from the fourth predetermined location to obtain the second predetermined location of the database server data. Thus, this embodiment further insulates the internal network from the external network by the ability to vary the location of the actual data stored on the first storage element by altering the definition of the location provided by the metadata.

Whether metadata and/or data is stored on the first storage element, the network server and the database server may periodically poll the first storage element to determine if additional metadata and/or data has been stored. If so, the database server may then access the first storage element to access the data, albeit without establishing a concurrent session with the network server.

The network server may be capable of supporting communication via the Internet Protocol (IP). For example, the network server may be in communication with at least one client element over the network via IP. The network server and the database server may transmit data to the first storage element and receive data from the first storage element via a non-IP messaging protocol. The database server may also communicate with the second storage element via the non-IP messaging protocol. The non-IP messaging protocol may be Fiberchannel protocol. The use of different protocol also adds to the security provided by the present invention.

In addition, the system, method and apparatus for securing network data of the present invention may include a firewall security device within the network between the client element and the network server. In this embodiment, the client element may transmit data to and from the network server through the firewall security device. Thus, the network may include a layer of security between the client elements and the network server to resist unauthorized users from accessing even the network server.

Furthermore, the first storage device and/or the second storage element may be a storage area network. This embodiment is advantageous as a first storage element for efficiently storing data for exchange between the network and database servers and/or as a second storage element for efficiently storing data within the internal network.

Thus, the system, method, and apparatus for securing data of the present invention provide an efficient and cost effective manner to prevent unauthorized users from accessing the internal network storage elements. By providing a common storage element between the network server and the internal database server with separate predetermined locations in which data from the network server and the database server may be stored, then accessed by the other server, the network server and the database server may exchange data without creating a concurrent session between the servers. In addition, a protocol break between the external network and the internal network components provides the ability to detect and track unauthorized users that attempt to access the internal network. Therefore, the embodiments of the present invention provide security for internal network data that otherwise would be vulnerable to being accessed by any user that could access the external network and, therefore, prevents users from taking advantage of the inherently non-secure nature of IP in order to gain access to the internal network and/or the data stored in the internal network.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The system, method and apparatus for securing network data of the present invention provide security for internal networks by utilizing a common storage element for the exchange of data between the external and internal network components without creating a concurrent session between the external and internal components. Thus, unauthorized users cannot access the internal network because there is never an open path between the external and internal components. In addition, the protocols implemented by the external and internal networks may be different to provide further separation. For example, when the protocol of the external network is Internet Protocol (IP), the protocol used for the internal network may be a non-IP messaging protocol that is more secure than IP. Thus, there may be a protocol break between the IP protocol of the external network and the non-IP messaging protocol of the internal network that provides further security for the internal network by insulating the internal network from IP and the attacks that are common in IP networks. Because the common storage element and protocol break security measures may be implemented without a significant change to the hardware or software elements of the internal or external networks, the system, method, and apparatus of the present invention provide the necessary security for the internal network without adding significant cost to the network administration. Furthermore, the system, method, and apparatus for securing network data of the present invention eliminate the need for multiple high-overhead security elements, such as firewalls, in the internal network, which, in turn, creates an efficient and secure network without the network performance degradation that is characteristic of conventional security measures.

Figure 1:
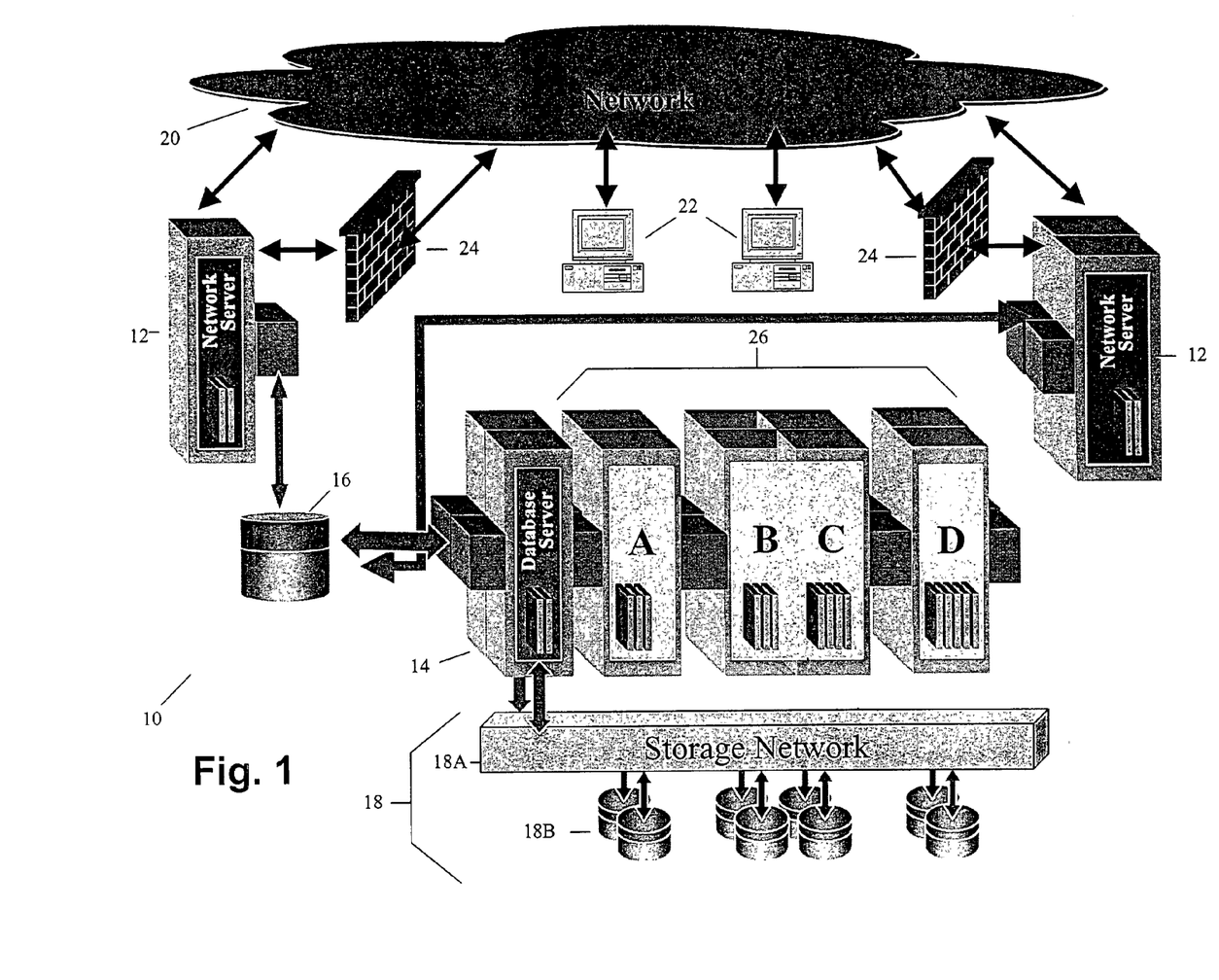
FIG. 1 is a network diagram of the system for securing network data according to one embodiment of the present invention.

FIG. 1 illustrates one embodiment of the system 10 for securing network data of the present invention. The system 10 includes at least one network server 12, a database server 14, a first storage element 16, a second storage element 18, and a network 20. The system 10 also may include at least one client element 22, a firewall security device 24 between the client element(s) 22 and the network server 12, and processing servers 26.

With reference to FIG. 1, an internal network is represented as the database server 14, the second storage element 18, and the processing servers 26. An external network is represented as the network server 12, the network 20, the client elements 22, and the firewall security device 24. The first storage element 16 may be part of the external network, or it may be in an intermediate network that is accessible by both the network server 12 and the database server 14, i.e., by both the internal and external networks. Any type of signaling known to those skilled in the art, such as discrete signaling, may be utilized for communication between and among the various components of the system 10 via the internal and external networks. In addition, the components may not necessarily be hard-wired, but instead may communicate via wireless transmissions, such as by utilizing blue tooth or other protocols.

The network server(s) 12 and the database server 14 may be any type of servers that may utilize any modern operating system, such as Microsoft Windows or Unix operating systems. The database server 14 may be any type of data source, such as a file system, a common executive, a custom application and/or memory that runs on any type of device or processing element capable of running such applications. In addition to being able to transmit and receive a wide variety of data, the network server(s) 12 and/or the database server 14 may be capable of transmitting and receiving metadata. The metadata contains information regarding other data, i.e., the actual data, that is transmitted and received by the servers. For example, as explained in detail hereinbelow, metadata transmitted to the first storage element 16 from the network server 12 may contain information regarding the location on the first storage element 16 where data that is also transmitted to the first storage element 16 from the network server 12 is stored in the first storage element 16. Likewise, metadata transmitted to the first storage element 16 from the database server 14 may contain information regarding the location on the first storage element 16 where data that is also transmitted to the first storage element 16 from the database server 14 is stored in the first storage element 16. The data that is stored by the first storage element at a location identified by metadata is generally considered to be associated with the metadata.

The servers may include processing components, or the network server(s) and/or the database server 14 may each be in communication with separate processing servers. An illustration of separate processing servers 26 in communication with database server 14 is shown in FIG. 1. The processing servers 26 may also be any type of server that may utilize any modem operating system. The processing servers 26 may perform any type of processing associated with data received via the database server 14. For example, as explained in greater detail hereinbelow, a client element 22 may transmit a request to the network server 12, the network server 12 may transmit the request to the first storage element 16, and the database server 14 may access the request from the first storage element. The database server 14 then may access the appropriate data from the second storage element 18. If the data must be processed in some manner in order to satisfy the request, then the database server 14 may provide the processing servers 26 with the data and the processing directions. Once the data is processed, the processing servers 26 provide the results to the database server 14, the database server 14 transmits the results to the first storage element 16, and the network server 12 accesses the results from the first storage element and transmits the results to the client element 22.

The first storage element 16 and second storage element 18 may be any type of storage element known to those skilled in the art, such as disks, tapes or memory. In one embodiment of the present invention, the first and/or second storage elements 16, 18 may be a Redundant Array of Independent Disk (RAID). RAIDs provide desirable data availability and performance by combining multiple storage disks under common management. RAID technology is known to those skilled in the art and is described in detail in a number of textbooks and technical handbooks, one example is P. Massiglia, *The RAID book, A Storage System Technology Handbook*, sixth edition, The RAID Advisory Board, Inc., St. Peter, Minn. (1997). In embodiments of the present invention in which the first and/or second storage elements 16, 18 store large amounts of data, the first and/or second storage elements 16, 18 may be a plurality of RAIDs (represented by 18A) associated with a switch or hub (represented by 18B). Furthermore, the first and/or second storage elements 16, 18 may comprise a Storage Area Network (SAN), which is an infrastructure utilizing Fiber Channel technology that allows multiple servers to efficiently connect to shared storage devices, such as RAIDs. SAN technology is also known to those skilled in the art and is described in detail in a number of textbooks and technical handbooks, one example is T. Clark, *Designing Storage Area Networks*, first edition, Addison-Wesley Pub. Co. (1999). Although SANs may be implemented in IP networks, they also may be implemented in other networks, such as Small Computer Storage Interface (SCSI) networks to provide more security than the IP network affords.

The network server 12 may communicate with one or more client elements 22 via the network 20. The network 20 may be any type of local area network (LAN) or wide area network (WAN), such as an intranet, Internet, or any other type of network. The network 20 may support communications via IP or any other protocol known to those skilled in the art.

The client elements 22 represent the device or devices that users may employ to perform any type of computing function. The client elements 22 may comprise laptop computers, personal computers or workstations, networked personal computers or workstations, or any other type of computing device or configuration operating on any type of computer platform and capable of supporting a user interface. The user interface may be a browser, such as an Internet browser or any other interface capable of appropriately displaying data, soliciting user input, and communicating with the network 20. The client elements 22 may physically be located anywhere as long as the client elements 22 are in communication with the network server. In addition to being in communication with the network server 12 via the network 20, client elements 22 may also be directly connected to or may be part of the network server 12.

Although not necessary for the practice of the present invention, a firewall security device 24 may be located between the network server 12 and the client elements 22. The firewall security device 24 may be a computing element or a group of computing elements that implements filtering, monitoring and logging of sessions between the client elements 22 and the network server 12. The firewall security device 24 may be implemented in applications that may reside on the network server 12, or in separate hardware units, such as routers or servers. If a firewall security device 24 is located in the communication path between the client elements 22 and the network server 12, the information transmitted between the client elements 22 and the network server 12 passes through the firewall. The firewall security device 24, thus, adds a layer of security on the side of the network server 12 that communicates with the network 20 in order to block particular client elements from accessing the network server 12. As described hereinabove, however, not all unauthorized client elements can be blocked by a firewall security device, particularly in an IP network. Therefore, the system 10, described in detail hereinbelow, provides the security necessary to prevent all unauthorized users from gaining access to an internal network.

The security provided by the system 10 is implemented, at least in part, in that, while both the network server 12 and the database server 14 may exchange data via the first storage element 16, a concurrent operating session between the network server 12 and the database server 14 is never created. Therefore, there is never an opportunity for a client element 22 to gain access into the internal network, which includes the database server 14 and the second storage element 18, via the network server 12 because the network server 12 has no direct communication with the database server 14 and has no information regarding the location of the database server 14.

Figure 2:
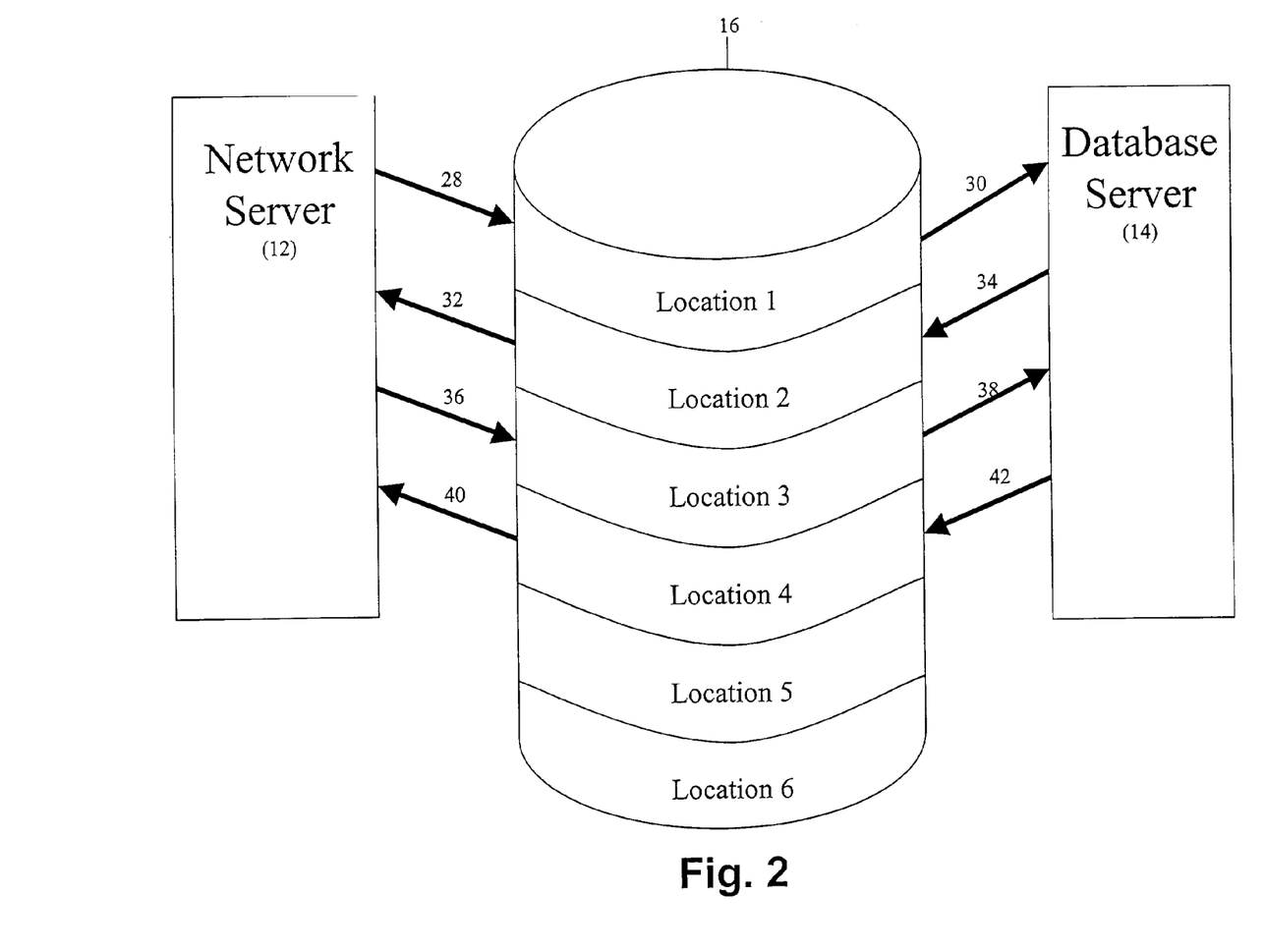
FIG. 2 is a diagram of a storage element depicting locations in the storage element that may receive and store data and/or metadata from a server, and the locations from which the server may access the data and/or metadata, according to one embodiment of the present invention.

FIG. 2 illustrates how the exchange of data between the network server 12 and the database server 14 via the first storage element 16 occurs without creating a concurrent operating session between the network server 12 and the database server 14, according to one embodiment of the present invention. The first storage element 16 has any number of separate locations, i.e., locations 1-6, as illustrated in FIG. 2. These locations may be specifically addressed memory locations or blocks of memory locations. The system is configured such that certain locations in the first storage element 16 can receive data only from the network server 12, as illustrated by arrows 28 and 36, pointing to Location 1 and Location 3, respectively, while other locations can receive data only from the database server 14, as illustrated by arrows 34 and 42, pointing to Location 2 and Location 4, respectively. In addition, the system is configured such that the locations that can receive data only from the network server 12, can be accessed only by the database server 14, as illustrated by arrows 30 and 38, pointing toward the database server 14 from Location 1 and Location 3, respectively. Likewise, the locations that can receive data only from the database server 14, can be accessed only by the network server 12, as illustrated by arrows 32 and 40, pointing toward the network server 12 from Location 2 and Location 4, respectively. Thus, the locations of the first storage element 16 function much like dropboxes that may receive information only from certain servers and that may be accessed only by other servers. For example, although network server 12 may transmit data to location in the first storage element 16, network server 12 cannot access that data, and although database server 14 may access the data from Location 1, database server 12 cannot transmit data to that location.

The instructions regarding which server may transmit data to which locations and which server may access data from which locations may be resident on the respective servers and/or the first storage element 16. In other embodiments of the present invention, the instructions may be derived from an algorithm that is resident on both the network server 12 and the database server 14. The algorithm dynamically determines the location(s) to which each server may transmit data and from which each server may access data in any manner known to those skilled in the art. For example, the algorithm may be based upon synchronized counters or timers that are part of or accessed by both the network server 12 and the database server 14 in order to ensure that both the network server 12 and the database server 14 have the same instructions for any given moment in time.

Figure 3A:
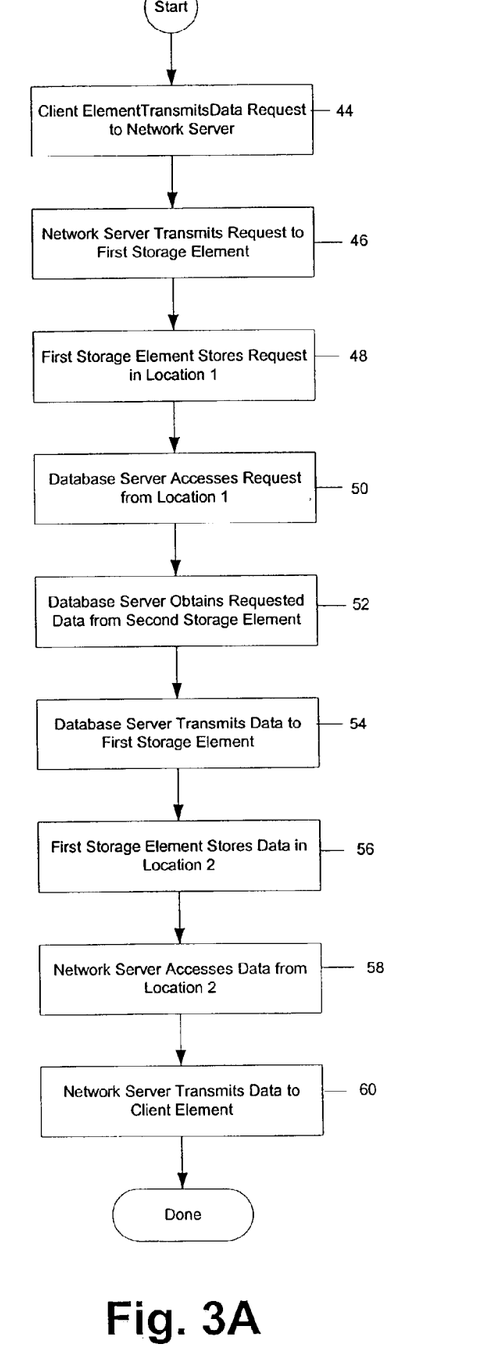
FIG. 3A is a flowchart of the data flow between a client element, the network server, the storage element, the database server, and a second storage element, according to one embodiment of the present invention.

FIG. 3A is a flowchart illustration of a flow of data among the various components and elements of a system 10, according to one embodiment of present invention. The flow of data generally begins when a client element 22 transmits a request to the network server 12, as illustrated in box 44. The request may be any type of request for data or processing that should be obtained from components within an internal network, i.e., the database server 14, the second storage element 18, and/or the processing server(s) 26. The network server 12 transmits the request to the first storage element 16, illustrated by box 46. According to instructions regarding which server(s) may transmit to which location(s) in the first storage element, as described above, the request is stored in the first storage element 16 in Location 1, as shown by box 48 of FIG. 3A and arrow 28 of FIG. 2. The database server 14 then may access the request from Location 1 in the first storage element 16 according to the instructions regarding which server(s) may access which location(s) in the first storage element, as described above, as shown by box 50 of FIG. 3A and arrow 30 of FIG. 2. Once the database server 14 reads the request, the database server may access the requested data, as illustrated by box 52. Accessing the requested data may include obtaining the requested data from the second storage element 18. Accessing the requested data may also include processing the data associated with the request and/or the data obtained from the second storage element 18 by the database server 14 and/or by the processing server(s) 26. Once the requested data is obtained by the database server 14, the database server 14 transmits the data to the first storage element 16, as illustrated by box 54. According to instructions regarding which servers may transmit to which locations in the first storage element, as described above, the request is stored in the first storage element 16 in Location 2, as shown by box 56 of FIG. 3A and arrow 34 of FIG. 2. The network server 12 accesses the requested data from Location 2 in the first storage element 16, as shown by box 58 of FIG. 3A and arrow 32 of FIG. 2. The network server 12 then may transmit the requested data to the client element that made the original request, as illustrated by box 60 of FIG. 3A.

As this data flow illustrates, the network server 12 and the database server 14 exchange data via the first storage element 16 without creating a concurrent session between the network server 12 and the database server 14. Thus, even if the client element were able to access the first storage element 16 through the network server's session with the first storage element, it could not access any element beyond the first storage element, i.e. the database server 14, the second storage element 18, and/or the processing servers 26, because there is never a connection between the network server 12 and the database server 14. In addition, although the network server 12 and the database server 14 transmit data to the same locations in the first storage element 16 accessed by the database server 14 and the network server 12, respectively, the processes never occur concurrently. Thus, by the time one server is accessing data from a location, the other server has already terminated its transmission session to that location.

In addition, network server 12 and/or database server 14 may be capable of transmitting and accessing metadata to and from the first storage element 16. As explained above, the metadata may include any type of information associated with the actual data that the server is also transmitting, such as the location in the first storage element 16 where the data is stored.

Figure 3B:
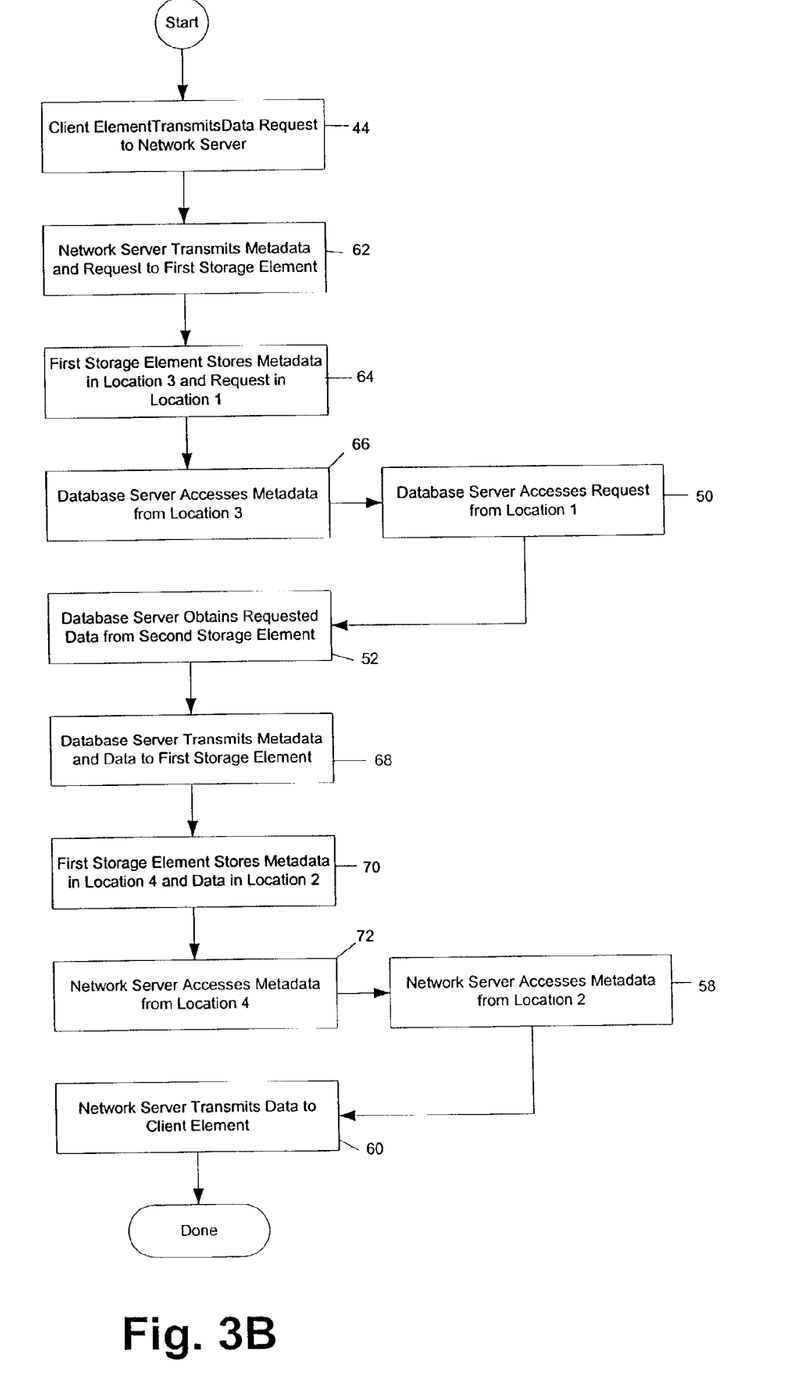
FIG. 3B is a flowchart of the metadata and data flow between the client element, the network server, the storage element, the database server, and the second storage element, according to one embodiment of the present invention.

FIG. 3B is a flowchart illustration of a flow of data among the various components and elements of a system 10, according to one embodiment of present invention in which the network server 12 and the database server 14 are capable of transmitting and receiving metadata in addition to other data. Again, the flow of data generally begins when a client element 22 transmits a request to the network server 12, as illustrated in box 44. The request may be any type of request for data or processing that should be obtained from components within an internal network, i.e., the database server 14, the second storage element 18, and/or the processing server(s) 26. According to instructions regarding which servers may transmit to which locations in the first storage element, as described above, the network server 12 creates metadata that contains the location in the first storage element 16 where the request will be stored, and the network server 12 transmits the metadata and the request to the first storage element 16, as illustrated by box 62. The metadata is stored in Location 3, as shown by box 64 of FIG. 3B and arrow 36 of FIG. 2, and the request is stored in the first storage element 16 in Location 1, as shown by box 64 of FIG. 3A and arrow 28 of FIG. 2. The database server 14 then may access the metadata from Location 3 according to the instructions regarding which servers may access which locations in the first storage element, as described above, and as illustrated by box 66 of FIG. 3B and arrow 38 of FIG. 2. The database server 14 obtains the location of the request from the information in the metadata, i.e. Location 1, and accesses the request from Location 1 in the first storage element 16, as shown by box 50 of FIG. 3B and arrow 30 of FIG. 2. Once the database server 14 reads the request, the database server may access the requested data, as illustrated by box 52. Accessing the requested data may include obtaining the requested data from the second storage element 18. Accessing the requested data may also include processing the data associated with the request and/or the data obtained from the second storage element 18 by the database server 14 and/or by the processing server(s) 26. According to instructions regarding which servers may transmit to which locations in the first storage element, as described above, the database server 14 creates metadata that contains the location in the first storage element 16 where the requested data will be stored, and the database server 14 transmits the metadata and the requested data to the first storage element 16, as illustrated by box 68. The metadata is stored in Location 4, as shown by box 70 of FIG. 3B and arrow 42 of FIG. 2, and the requested data is stored in the first storage element 16 in Location 2, as shown by box 70 of FIG. 3B and arrow 34 of FIG. 2. The network server 12 then may access the metadata from Location 4 according to instructions regarding which servers may transmit to which locations in the first storage element, as described above, and as illustrated by box 72 of FIG. 3B and arrow 40 of FIG. 2. The network server 12 obtains the location of the requested data from the information in the metadata, i.e. Location 2, and accesses the requested data from Location 2 in the first storage element 16, as shown by box 58 of FIG. 3B and arrow 32 of FIG. 2. The network server 12 then may transmit the requested data to the client element that made the original request, as shown by box 60 of FIG. 3B.

As the data flow of FIG. 3B illustrates, the network server 12 and the database server 14 may exchange metadata and data via the first storage element 16 without creating a concurrent session between the network server 12 and the database server 14. The metadata provides one more layer of security for the internal network. Thus, even if a client element were able to access the first storage element 16 through the network server's session with the first storage element, it could only access Location 3 of the first storage element, which contains metadata that the client element cannot read unless it is also a metadata server. As such, most client elements will not even be able to access the limited amount of data stored on the first storage element 16. Furthermore, as explained above, the client elements cannot access any element beyond the first storage element, i.e. the database server 14, the second storage element 18, and/or the processing servers 26, because there is never a connection between the network server 12 and the database server 14.

Although the examples associated with FIGS. 3A and 3B describe scenarios in which the network server 14 submits a request to the first storage element 16, and the database server 12 submits the requested data to the first storage element 16, there may be many other data exchange scenarios covered by the present invention. For example, the network server 12 may submit data from a client element 22 to the first storage element 16 for the database server 14 to access and store in the second storage element 18. This scenario is advantageous for updating client element information that is stored in the second storage element 18. Furthermore, the database server 14 may submit data from the second storage element 18 and/or the processing servers 26 to the first storage element 16 for the network server 12 to access and transmit to one or more client elements 22. This scenario is advantageous for updating information stored in the client elements 22, such as a new version of an application or operating system or any other type of update.

Because the network server 12 and the database server 14 are never in direct communication with each other, the network server 12 and database server 14 may periodically poll the first storage element 16 to determine if additional metadata and/or data has been stored. For the example shown in FIG. 3A, the database server 14 may poll Location 1 of the first storage element 16 on a periodic basis, such as once a minute or every 30 seconds or any other basis, to determine if the network server 12 has stored data, such as a request, in Location 1. The network server 12 also may poll Location 2 of the first storage element 16 on any type of periodic basis, which may be the same or a different periodic basis than that of the database server 14, to determine if the database server 14 has stored data, such as the requested data, in Location 2. For the example shown in FIG. 3B, the database server 14 may poll Location 3 on any type of periodic basis to determine if the network server 12 has stored metadata in Location 3. The network server 12 also may poll Location 4 of the first storage element 16 on any type of periodic basis to determine if the database server 14 has stored data in Location 4. Thus, there is no information in the first storage element 16 regarding the locations of the network server 12 and the database server 14, which provides further security for the internal network.

In all of the examples and scenarios described above, the network server 12 may communicate with the client element(s) 22 via a different protocol than the protocol by which the network server 12 communicates with the first storage element 16. For example, the network server 12 may communicate with the client element(s) 22 via Internet Protocol (IP), and may communicate with the first storage element 16 via any type of non-IP messaging protocol, such as Fiberchannel protocol. In addition, the database server may also communicate with the first storage element 16 via a non-IP messaging protocol, such as Fiberchannel protocol. The non-IP messaging protocol is a more secure protocol than IP, and, therefore, the client element(s) 22 are further prevented from accessing the first storage element 16 and the internal network. In this example, if the second storage element 18 is a storage area network, then it may communicate over a Small Computer System Interface (SCSI) via a non-IP messaging protocol, such as Fiberchannel protocol.

In some embodiments of the present invention, the metadata may be transmitted between the network server 12 and the first storage element 16 and between the database server and the first storage element 16 via IP. However, the data with which the metadata is associated may be transmitted between the network server 12 and the first storage element 16 and between the database server and the first storage element 16 via a non-IP messaging protocol. Thus, various protocols may be utilized in combination to provide the most efficient, yet secure, network configuration.

The system, method and apparatus for securing network data of the present invention therefore provide multiple safeguards for ensuring that an internal network is insulated from attacks coming from the external network that conventional networks do not. The lack of a concurrent session between the network server 12 and the database server 14 due to the exchange of data via the first storage element 16 prevents a client element 22 from the outside network from gaining access to the internal network. In addition, even if a client element 22 accesses the first storage element 16, there is no information in the first storage element 16 regarding the location of the database server 14, so the client element 22 has no way of accessing the database server 14, and, thus, the internal network. Furthermore, the ability to require communications via a more secure protocol between the network server 12 and the first storage element 16, in addition to requiring communications via the more secure protocol within the internal network, provide further layers of security for the internal network, as well as a manner in which to track any unauthorized users of the internal network. Therefore, the embodiments of the present invention provide security for internal network data that otherwise would be vulnerable to being accessed by any user that could access the external network and, therefore, prevents users from taking advantage of the inherently non-secure nature of IP in order to gain access to the internal network and/or the data stored in the internal network.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for securing network data, comprising:
   a network;
   first and second storage elements;
   a network server in communication with said first storage element via said network, wherein the network server is configured provide both a request and associated metadata to the first storage element via different protocols with the network server configured to provide the request via a protocol that more greatly limits access for unauthorized users than the protocol via which the network server provides the associated metadata; and
   a database server in communication with said first storage element and said second storage element, wherein the first storage element receives and stores the request from only said network server in a first predetermined location and data from only said database server in a second predetermined location, wherein only said network server is capable of accessing the data stored by said first storage element in the second predetermined location even though data is only stored in the second predetermined location by the database server, and wherein only said database server is capable of accessing the request stored by said first storage element in the first predetermined location even though data is only stored in the first predetermined location by the network server, such that said network server and said database server are capable of exchanging the request and responsive data via said first storage element without creating a concurrent operating session so as to avoid establishing any direct communication between said network server and said database server.

2. The system of claim 1, wherein said network server is configured to provide the metadata to the storage device via Internet Protocol (IP).

3. The system of claim 2, wherein said network server and said database server transmit the request to said first storage element and access data from said first storage element via a non-IP messaging protocol.

4. The system of claim 3, wherein the non-IP messaging protocol is Fiberchannel protocol.

5. The system of claim 2, further comprising a firewall security device within said network between the at least one client element and said network server.

6. The system of claim 5, wherein the at least one client element is capable of transmitting data to and from said network server through said firewall security device.

7. The system of claim 1, wherein said database server is also capable of transmitting and receiving metadata that at least partially defines associated data.

8. The system of claim 7, wherein said first storage element stores metadata received from said network server in a third predetermined location, wherein the metadata defines the first predetermined location at which the request that is also received from said network server is stored, and wherein said database server accesses the metadata from the third predetermined location to obtain the first predetermined location of the request.

9. The system of claim 7, wherein said first storage element stores metadata received from said database server in a fourth predetermined location, wherein the metadata defines the second predetermined location at which data that is also received from said database server is stored, and wherein said network server accesses the metadata from the fourth predetermined location to obtain the second predetermined location of the data.

10. The system of claim 1, wherein said network server and said database server are capable of periodically polling said first storage element to determine if additional data or an additional request has been stored.

11. The system of claim 1, wherein said second storage element comprises a storage area network.

12. The system of claim 1, wherein said first storage element comprises a storage area network.

13. A method for securing network data, comprising:
receiving a request and associated metadata from a network server via a network and in accordance with different protocols with the protocol via which the request is received more greatly limiting access for unauthorized users than the protocol via which the associated metadata is received, wherein receiving the request comprises receiving the request from the network server in a first predetermined location of a first storage element, wherein the first storage element only receives the request in the first predetermined location from the network server;
receiving data from a database server in a second predetermined location of the first storage element, wherein the first storage element only receives data in the second predetermined location from the database server;
providing access, only to the database server, to the request stored in the first predetermined location of the first storage element by the network server; and
providing access, only to the network server, to the data stored in the second predetermined location of the first storage element by the database server;
wherein the network server and the database server exchange the request and responsive data via the first storage element without creating a concurrent operating session so as to avoid establishing any direct communication between the network server and the database server.

14. The method of claim 13, wherein receiving associated metadata comprises receiving associated metadata from the network server via IP.

15. The method of claim 14, wherein receiving data and providing access to data comprises receiving data and providing access to data via a non-IP messaging protocol.

16. The method of claim 15, wherein the non-IP messaging protocol is a Fiberchannel protocol.

17. The method of claim 13, further comprising:
establishing communications between the database server and a second storage element; and
receiving information at the database server from the second storage element that was requested by the request, and
wherein receiving data from the database server in a second predetermined location comprises receiving the data provided to the database server by the second storage element in the second predetermined location.

18. The method of claim 13, further comprising establishing communications between the database server and a storage area network.

19. The method of claim 13, further comprising establishing communications between the network server and a storage area network and between the database server and the same storage area network.

20. The method of claim 13, further comprising storing metadata received from the network server in a third predetermined location, wherein the metadata defines the first predetermined location at which the request that is also received from the network server is stored, and accessing the metadata by the database server from the third predetermined location to obtain the first predetermined location of the request.

21. The method of claim 13, further comprising storing metadata received from the database server in a fourth predetermined location, wherein the metadata defines the second predetermined location at which data that is also received from the database server is stored, and accessing the metadata by the network server from the fourth predetermined location to obtain the second predetermined location of the data.

22. The method of claim 13, further comprising polling the storage element by the network server and the database server to determine if additional data or an additional request has been stored.

23. The system of claim 1 further comprising a plurality of network servers in communication with the storage device for exchanging requests and responsive data with the database server.

24. The method of claim 13 wherein further comprising receiving requests and associated metadata from a plurality of network servers.

25. The system of claim 1 wherein the network server and the database server include instructions which define the first and second predetermined locations, respectively, prior to providing the request and data thereto, respectively.

26. The method of claim 13 wherein the first and second predetermined locations are defined for the network server and the database server, respectively, prior to receiving the request and data from the network server and the database server, respectively.

27. The system of claim 1 wherein the network server and the database server are each configured to execute an algorithm to dynamically determine the first and second locations.

28. The method of claim 13 further comprising executing an algorithm at both the network server and the database server in order to dynamically determine the first and second locations.

\* \* \* \* \*

UNITED STATES PATENT AND TRADEMARK OFFICE
CERTIFICATE OF CORRECTION

PATENT NO. : 7,631,179 B2 Page 1 of 1
APPLICATION NO. : 10/211086
DATED : December 8, 2009
INVENTOR(S) : Kuehn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Second Day of November, 2010

David J. Kappos
*Director of the United States Patent and Trademark Office*